(12) United States Patent
Dandra et al.

(10) Patent No.: US 10,869,351 B2
(45) Date of Patent: Dec. 15, 2020

(54) METHODS AND USER EQUIPMENT FOR RECOVERING FROM ISSUES OF CONNECTIVITY BETWEEN A PLMN AND A UE

(71) Applicant: Samsung Electronics Co., Ltd., Suwon-si (KR)

(72) Inventors: Prasad Basavaraj Dandra, Bengaluru (IN); Vijay Ganesh Surisetty, Bengaluru (IN); Srinivas Chinthalapudi, Bengaluru (IN); Ramkumar Thirumalli Sureshsah, Bengaluru (IN); Seshadri Elluru, Bengaluru (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/278,837

(22) Filed: Feb. 19, 2019

(65) Prior Publication Data

US 2020/0214068 A1 Jul. 2, 2020

(30) Foreign Application Priority Data

Dec. 31, 2018 (IN) .............................. 201841050055

(51) Int. Cl.
| | | |
|---|---|---|
| *G01R 31/08* | (2020.01) | |
| *H04W 76/18* | (2018.01) | |
| *H04W 76/19* | (2018.01) | |
| *H04W 40/24* | (2009.01) | |
| *H04W 60/00* | (2009.01) | |

(Continued)

(52) U.S. Cl.
CPC .......... *H04W 76/18* (2018.02); *H04W 40/24* (2013.01); *H04W 60/00* (2013.01); *H04W 76/19* (2018.02); *H04W 76/30* (2018.02); *H04W 84/042* (2013.01)

(58) Field of Classification Search
None
See application file for complete search history.

(56) References Cited

U.S. PATENT DOCUMENTS

| | | | |
|---|---|---|---|
| 7,181,212 B2 * | 2/2007 | Hogan | .................. H04W 60/00 455/434 |
| 8,463,269 B2 | 6/2013 | Mubarek et al. | |

(Continued)

OTHER PUBLICATIONS

GSMA; *Device Field and Lab Test Guidelines*, Version 11.4; Jun. 13, 2013.

*Primary Examiner* — Phuongchau Ba Nguyen
(74) *Attorney, Agent, or Firm* — Harness, Dickey & Pierce, P.L.C.

(57) ABSTRACT

Methods are provided for recovering from abnormal scenarios that cause release of a connection between network and UE including, detecting an interruption of a Radio Resource (RR) connection with a first PLMN associated with at least one first parameter, the interruption resulting in a loss of access to at least one type of service from the first PLMN, adding the at least one first parameter, the at least one type of service, and a defined time period to a list for the defined time period, and detecting a second PLMN associated with at least one second parameter within the defined time period, the second PLMN providing access to the at least one type of service, the at least one second parameter being different from the at least one first parameter.

20 Claims, 5 Drawing Sheets

(51) Int. Cl.
*H04W 76/30* (2018.01)
*H04W 84/04* (2009.01)

(56) References Cited

U.S. PATENT DOCUMENTS 8,885,466 B1 * 11/2014 Seleznyov .............. H04W 4/50
370/229
9,525,995 B2 12/2016 Grenier-Raud et al.

* cited by examiner

METHODS AND USER EQUIPMENT FOR RECOVERING FROM ISSUES OF CONNECTIVITY BETWEEN A PLMN AND A UE

CROSS-REFERENCE TO RELATED APPLICATION

This U.S. nonprovisional application claims priority under 35 U.S.C § 119 to Indian Patent Application No. 201841050055 filed on Dec. 31, 2018 in the Indian Patent Office, the entire contents of which are hereby incorporated by reference.

TECHNICAL FIELD

Some example embodiments herein relate to wireless network connectivity, and more particularly to methods and user equipment for recovering from abnormal scenarios causing connectivity issues between a Public Land Mobile Network (PLMN) and a User Equipment (UE).

BACKGROUND

Currently, User Equipment (UEs) is configured to delete Registered Public Land Mobile Network (RPLMN) and Equivalent PLMN (EPLMN) information, when a Radio Resource (RR) connection is released due to occurrence of an abnormal scenario at the PLMN side and/or the UE side. The UEs delete information including parameters associated with the PLMN such as Location Area Identity (LAI), Temporary Mobile Subscriber Identity (TMSI), ciphering key sequence number, and so on; which are stored in the Subscriber Identity Module/Universal Mobile Telecommunications System (UMTS) Subscriber Identity Module (SIM/USIM). Examples of the abnormal scenarios resulting in RR connection release include, but are not limited to, network failure, registration request transmission failure, congestion, and lack of response to registration request of the UE.

The UE deletes the above-mentioned information based on guidelines defined in the specification of $3^{rd}$ Generation Partnership Project (3GPP). The UE then enters into an idle state for PLMN search and/or selection. In Long Term Evolution (LTE) scenario, due to deletion of the RPLMN and PLMNs in the EPLMN list, the UE may disable evolved Universal Terrestrial Radio Access (eUTRA) capability. In such a situation, the UE is only able to operate in $2^{nd}$ Generation (2G) or $3^{rd}$ Generation (3G) Radio Access Technology (RAT) modes. If the network selection is set to automatic mode, the UE performs PLMN selection to search PLMNs, which provide both Circuit Switching (CS) and Packet Switching (PS) services. If the network selection is set to manual mode, access to services for the UE is limited until the user changes the PLMN selection mode to automatic or selects a different PLMN.

SUMMARY

Accordingly, some example embodiments provide methods performed by a User Equipment (UE) for managing services availed from a Public Land Mobile Network (PLMN). The methods include detecting an interruption of a Radio Resource (RR) connection with a first PLMN associated with at least one first parameter, the interruption resulting in a loss of access to at least one type of service from the first PLMN. The methods include adding the at least one first parameter, the at least one type of service, and a defined time period to a list for the defined time period. The methods include detecting a second PLMN associated with at least one second parameter within the defined time period, the second PLMN providing access to the at least one type of service, the at least one second parameter being different from the at least one first parameter.

Some example embodiments provide User Equipment (UEs) for managing services availed from a Public Land Mobile Network (PLMN). The UEs include a receiver configured to detect an interruption of a Radio Resource (RR) connection with a first PLMN associated with at least one first parameter, the interruption resulting in a loss of access to at least one type of service from the first PLMN, and at least one processor configured to add the at least one first parameter, the at least one type of service, and a defined time period to a list for the defined time period. The receiver is further configured to detect a second PLMN associated with at least one second parameter within the defined time period, the second PLMN providing access to the at least one type of service, the at least one second parameter being different from the at least one first parameter.

These and other aspects of the example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF FIGURES

Some example embodiments are illustrated in the accompanying drawings, throughout which like reference letters indicate corresponding parts in the various figures. The example embodiments herein will be better understood from the following description with reference to the drawings, in which.

DETAILED DESCRIPTION

Figure 1:
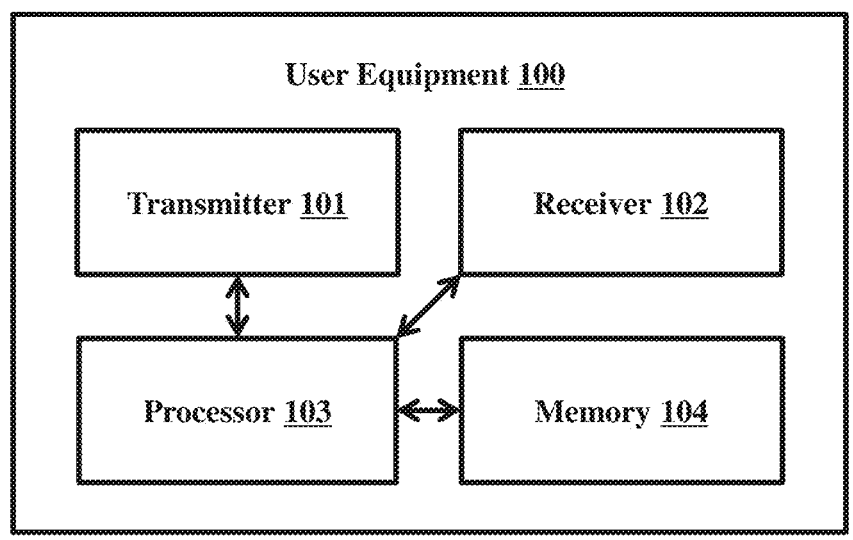
FIG. 1 depicts a block diagram of a UE for recovering from abnormal scenarios that cause release of an RR connection between a PLMN and the UE, according to some example embodiments as disclosed herein.

The example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the some example embodiments herein. The examples used herein are intended merely to facilitate an understanding of ways in which the example embodiments herein may be practiced and to further enable those of skill in the art to practice the example embodiments herein. Accordingly, the examples should not be construed as limiting the scope of the example embodiments herein.

Some example embodiments herein disclose methods and user equipment for enabling recovery from abnormal scenarios, occurring at a Public Land Mobile Network (PLMN) and/or a User Equipment (UE), causing release of a Radio Resource (RR) connection between the PLMN and the UE. The abnormal scenarios can also lead to rejection of registration request which is sent from the UE to the PLMN so that the UE can register with the PLMN. The example embodiments include maintaining a list including at least one PLMN and parameters associated with the at least one PLMN, a defined time period for which the at least one PLMN is to be stored in the list, and services (e.g., Packet Switching (PS) and/or Circuit Switching (CS)) not provided by the at least one PLMN. The defined time period can refer to a dynamically configurable value. The UE may avoid registration attempts with the PLMN throughout this defined period, as the PLMN had not sent a registration accept message to the UE in response to the previous registration attempt of the UE, to indicate the UE that the PLMN is ready to provide CS, PS, or both CS and PS. The UE may also avoid registration attempts with the PLMN throughout the defined period, as the RR connection between the PLMN and the UE was suspended.

The parameters include a PLMN identity of the at least one PLMN, a Tracking Area Code (TAC) and/or Location Area Code (LAC) of the at least one PLMN, and so on. The example embodiments include performing a PLMN search excluding the at least one PLMN in the list, for a period similar or equal to the defined time period. Once the time period expires, the at least one PLMN may be considered for PLMN search. The example embodiments include detecting a PLMN within the defined time period for receiving at least one of PS or CS services.

The example embodiments include performing a PLMN search for detecting a PLMN, which may provide both PS and CS services, while receiving either a PS or CS service from a Registered PLMN (RPLMN). The example embodiments include preserving the RPLMN and PLMNs in an Equivalent PLMN (EPLMN) list and performing selection of a PLMN included within the EPLMN for receiving PS and/or CS services on different Radio Access Technologies (RATs).

Some example embodiments herein provide methods and user equipment to enable recovery from abnormal scenarios occurring at a Public Land Mobile Network (PLMN) and/or a User Equipment (UE), resulting in release of a Radio Resource (RR) connection between the PLMN and the UE.

Some example embodiments herein provide for maintaining a list, including at least one PLMN with at least one associated parameter, e.g., a PLMN identity of the at least one PLMN and a Tracking Area Code TAC) and/or Location Area Code (LAC) of the at least one PLMN; a time period for which the at least one PLMN is to be stored in the list; and services (e.g., Packet Switching (PS) and/or Circuit Switching (CS)) not offered (e.g., rejected) by the at least one PLMN; wherein the at least one PLMN in the PLMN list may be connected to once the time period expires.

Some example embodiments herein provide for performing a PLMN search, and detecting a PLMN, which may provide both PS and CS services, while receiving either a PS or CS service from a Registered PLMN (RPLMN).

Some example embodiments herein provide for preserving a RPLMN and PLMNs in the Equivalent PLMN (EPLMN) list and performing selection of a PLMN, included in the EPLMN list, for receiving PS and/or CS services on different Radio Access Technologies (RATs).

Referring now to the drawings, and more particularly to FIGS. 1 through 5d, where similar reference characters denote corresponding features consistently throughout the figures, there are shown some example embodiments.

FIG. 1 depicts various units of a UE 100 for recovering from abnormal scenarios that cause release of an RR connection between a PLMN and the UE 100. The UE 100 includes a transmitter 101, a receiver 102, at least one processor 103 (also referred to herein in the singular "the processor 103"), and a memory 104 (also referred to herein as the "components" of the UE 100). The UE 100 may refer to terminal equipment, a Mobile Station (MS), a Mobile Terminal (MT), a User Terminal (UT), a Subscriber Station (SS), a wireless device, or a handheld device. The UE 100 may be capable of operating in different RATs. According to some example embodiments, operations described herein as being performed by any or all of the transmitter 101, the receiver 102, the at least one processor 103, and the UE 100 may be performed by at least one processor (e.g., the at least one processor 103) executing program code that includes instructions corresponding to the operations. The instructions may be stored in a memory of the UE 100 (e.g., the memory 104). The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The transmitter 101 may send registration requests to one or more PLMNs for receiving PS and/or CS services (e.g., by transmitting a Location Area Update (LAU)). For example, the transmitter 101 may send the registration request to a base station connected to the respective one or more PLMNs. Operations described herein as being performed by a PLMN and/or a RPLMN may be performed by a base station connected to the PLMN and/or the RPLMN. The base station may refer to a Node B, an evolved-Node B (eNB), a sector, a site, a Base Transceiver System (BTS), an Access Point (AP), a relay node, a Remote Radio Head (RRH), a Radio Unit (RU), or a small cell. According to some example embodiments, the BS or cell may refer to a function or an area covered by a base station controller (BSC) in Code Division Multiple Access (CDMA), a Node-B in Wide Band CDMA (WCDMA), an eNB or a sector (site) in Long Term Evolution (LTE), and may include a mega cell, a macro cell, a micro cell, a picocell, a femtocell, and/or various coverage areas, e.g., coverage ranges of a relay node, an RRH, an RU, or a small cell. The UE 100 may transmit uplink signals to a RPLMN through the transmitter 101. In an example, consider the RPLMN as a first PLMN. The receiver 102 may detect an occurrence of an abnormal scenario at the UE 100 and/or at the RPLMN which causes release of an RR connection between the UE 100 and the RPLMN. The UE 100 may receive downlink information from the RPLMN (e.g., from a base station connected to the RPLMN) through the receiver 102.

The UE 100 may communicate with (e.g., receive signals from and/or transmit signals to) the base station over a wireless communication network. The wireless communication network may refer to 5th generation wireless (5G), Long Term Evolution (LTE), LTE-Advanced, CDMA, Global System for Mobile Communications (GSM), Wireless Local Area Network (WLAN), or another wireless communication network. Information may be communicated via the wireless communication network in various multiple access manners such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Orthogonal Frequency Division Multiplex (OFDM) FDMA (OFDM-FDMA), OFDM-TDMA, or OFDM-CDMA.

The processor 103 may interact with the receiver 102 to determine whether there is an abnormal scenario has occurred that causes a release of the RR connection between the RPLMN and the UE 100. The abnormal scenario may occur at the UE 100 and/or at the PLMN. The abnormal scenarios include, but are not limited to, rejection of registration request of the UE 100 by the PLMN due to network failure, congestion, and so on; failure of transmission of the registration request by the UE 100; lack of response from the PLMN to the registration request of the UE 100; and so on. The processor 103 may add information to a list including at least one parameter associated with the at least one PLMN. The list may be stored in the memory 104. The list may include the at least one parameter associated with the at least one PLMN, one or more types of services not provided by the at least one PLMN, and a defined time period. The at least one parameter associated with the at least one PLMN may be an identity of the PLMN, a TAC and/or LAC of the PLMN, and so on. The processor 103 may cause the at least one parameter associated with the at least one PLMN, the one or more types of services not provided by the at least one PLMN, and the defined time period to be stored in the memory 104 for the defined time period.

In an example, consider the RPLMN as a first PLMN. The receiver 102 may detect the occurrence of an abnormal scenario at the first PLMN and/or the UE 100 such as rejection of a registration request from the UE 100 by the first PLMN due to network failure and/or congestion, failure of transmission of the registration request, absence of a response to a registration request, and so on. Due to the occurrence of at least one abnormal scenario, the RR connection between the first PLMN and the UE 100 may be interrupted. Accordingly, the first PLMN may not provide PS and/or CS services.

The receiver 102 may indicate the occurrence of the at least one abnormal scenario to the processor 103. Thereafter, the processor 103 may add the one or more parameters associated with the first PLMN, e.g., the identity of the first PLMN, the LAC and/or TAC of the first PLMN, the one or more types of services (e.g., PS and/or CS) not provided by the first PLMN, and a defined time period to the list.

The defined time period indicates the time period for which the parameters of the first PLMN will be stored in the list. In an example, the identity of the first PLMN may be PLMN A, the LAC/TAC may be (EFF3)$_H$, the first PLMN may stop offering (e.g., providing) CS services, and the defined time period, for which the parameters of the first PLMN are stored in the list, is 12 minutes. The entry that is added to the list by the processor 103 may be: PLMN A/EFF3/CS/12.

The receiver 102 may detect a second PLMN for receiving the CS service. The detection process may be directed by the at least one processor 103, wherein at least one parameter of the second PLMN is different from the parameters of the first PLMN. Examples of different parameters of PLMNs may be represented by PLMN A/EFF4/CS, PLMN B/F22E/CS, PLMN B/EFF3/CS, and so on.

The receiver 102 attempts to detect the second PLMN within the defined time period, e.g., 12 minutes. The processor 103 may be delete the parameters of the first PLMN, stored in the list, once the defined time period is over, e.g., the 12 minutes are over. Thereafter, the first PLMN may again be considered for detection, in order to receive the CS service.

The example may be extended to scenarios, wherein PS services are stopped (e.g., stopped offering and/or providing) by the first PLMN and/or both PS and CS services are stopped by the first PLMN. An example entry added to the list on occurrence of the former scenarios may be PLMN A/EFF3/PS/12 and the latter scenarios may be PLMN A/EFF3/PS and CS/12.

In some example embodiments, if CS services is rejected (e.g., stopped offering and/or providing) by the first PLMN, the receiver 102 may detect the second PLMN, for receiving both CS and PS services, while receiving PS services from the first PLMN. Similarly, if PS service is rejected by the first PLMN, the receiver 102 may detect the second PLMN, for receiving both CS and PS services, while receiving CS services from the first PLMN.

In some example embodiments, the processor 103 may retain parameters of RPLMN and/or PLMNs included in the EPLMN list in the memory 104, in case the RPLMN stops offering services to the UE 100 due to the occurrence of an abnormal scenario.

FIG. 1 shows example components of the UE 100, but it is to be understood that some example embodiments are not limited thereon. In some example embodiments, the UE 100 may include less or more components. Further, the labels or names of the components are used only for illustrative purposes and do not limit the example embodiments. One or more components may be combined together to perform same or substantially similar function in the UE 100.

Figure 2:
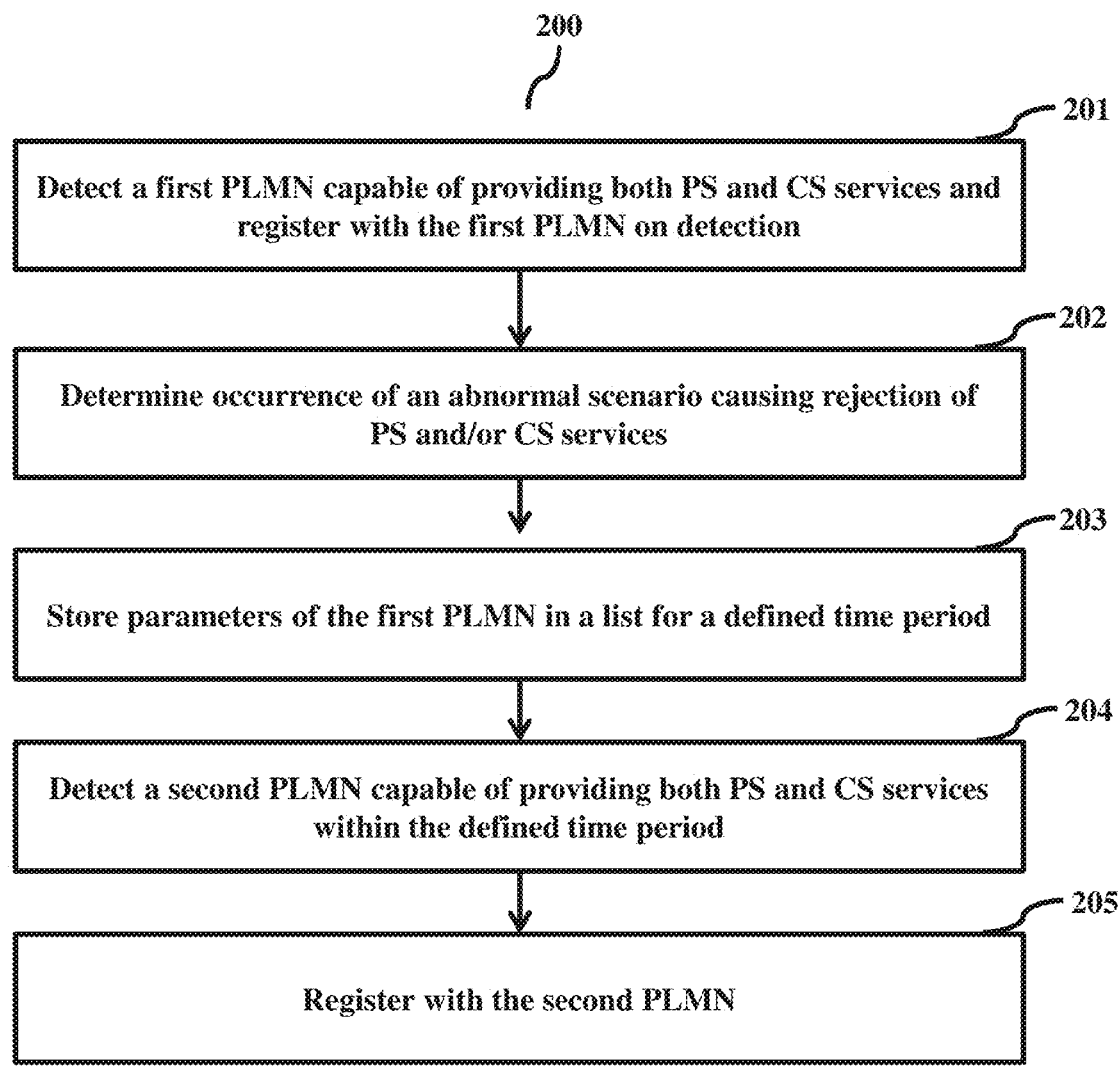
FIG. 2 is a flowchart depicting a method performed by a UE for recovering from abnormal scenarios that cause release of an RR connection between the PLMN and the UE, according to some example embodiments as disclosed herein.

FIG. 2 is a flowchart 200 depicting the method performed by the UE 100 for recovering from abnormal scenarios that cause release of an RR connection between a PLMN and the UE 100.

At operation 201, the method includes determining a first PLMN capable of providing both PS and CS services. On detection of the first PLMN, the UE 100 may register with the first PLMN. The UE 100 may, thereafter, receive PS and/or CS services from the first PLMN. While receiving the PS and/or CS services from the first PLMN, at operation 202, the UE 100 may determine that an abnormal scenario has occurred at the first PLMN, at the UE 100, or at both the first PLMN and at the UE 100. Due to the occurrence of the abnormal scenario, either the PS service or the CS service, or both the PS and CS services may be interrupted, as the first PLMN rejects to offer (e.g., stops offering or providing) the respective service to the UE 100.

Once the UE 100 determines that the abnormal scenario has occurred in operation 202, then the method includes, at operation 203, storing the parameters associated with the first PLMN in a list. In some example embodiments, the parameters include the identity of the first PLMN, TAC, LAC, and so on. The parameters associated with the first PLMN may be stored in the list for a defined time period. At operation 204, the method includes detecting a second PLMN capable of providing both PS and CS services. The UE 100 attempts to detect the second PLMN within the defined time period, wherein at least one parameter associated with the second PLMN is different from at least one parameter associated with the first PLMN. Thus, at least one of the PLMN identity, LAC, TAC, and so on, of the second PLMN is different from the first PLMN. According to some example embodiments, if the first PLMN only stops providing one of the PS or CS services, the method includes continuing to receive a service, e.g., the other of the PS or CS services from the first PLMN while attempting to detect a second PLMN in operation 204. At operation 205, the method includes the UE 100 registering with the second PLMN.

After the defined time period expires, the parameters associated with the first PLMN may be removed from the list, and the first PLMN may be detected and considered for registration. In some example embodiments, if the second PLMN is of a lower priority compared to the first PLMN, the UE 100 may attempt to detect (and register with) the first PLMN for receiving PS and CS services. According to some example embodiments, the UE 100 may attempt to detect the first PLMN only after the expiry of the defined time period.

Figure 3A:
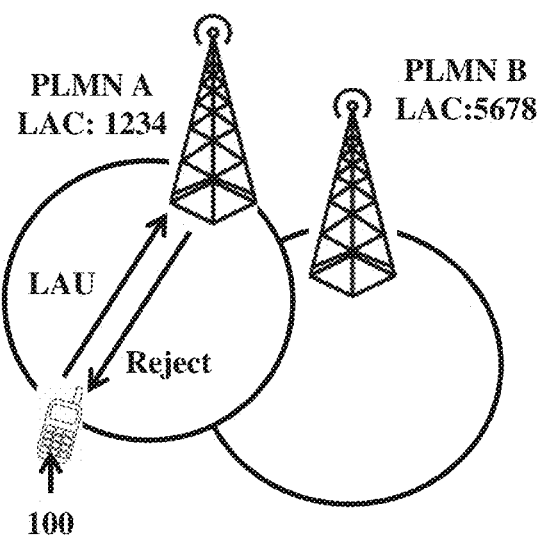
FIGS. 3a-3c depict an example scenario, wherein a UE registers with a PLMN after the PLMN stops providing CS and/or PS services to the UE, according to some example embodiments as disclosed herein.
Figure 3B:
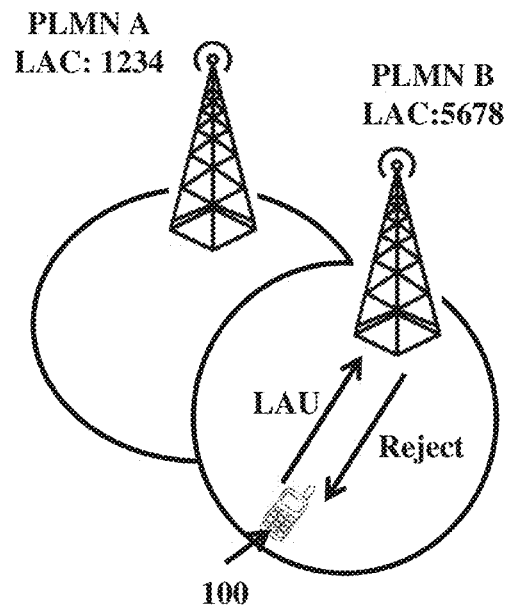
Figure 3C:
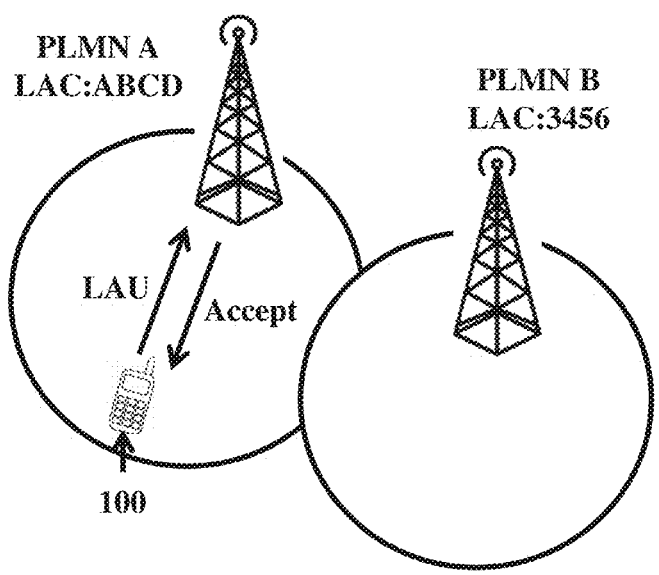

FIGS. 3a-3c depict an example scenario, wherein the UE 100 may register with a PLMN (e.g., PLMN A) that has previously stopped providing CS and/or PS services to the UE 100. In this scenario, network selection in the UE 100 is set to automatic mode. Consider that the UE 100, in a particular location, may attempt to register with PLMN A having the LAC $(1234)_H$. As depicted in FIG. 3a, the UE 100 may transmit a Location Area Update (LAU) to the PLMN A for registering with the PLMN A. The PLMN A may not be able to respond to the registration request, or may reject the registration request, due to occurrence of an abnormal scenario.

If it is considered that the UE 100 was receiving at least one of PS and CS, then occurrence of an abnormal scenario at the UE 100 and or the PLMN A may result in the PLMN A stopping offering both PS and CS services.

In such circumstances, conventional UEs delete information associated with the PLMN A (e.g., parameters associated with the PLMN such as Location Area Identity (LAI), Temporary Mobile Subscriber Identity (TMSI), ciphering key sequence number, and so on), in compliance with the 3GPP specification. However, in some example embodiments, the UE 100 may add the identity and LAC of the PLMN A to a list stored at the UE 100. The UE 100 may set a first defined time period, during which the UE 100 may exclude the PLMN A with LAC $(1234)_H$, while performing a PLMN search for detecting another PLMN. After the first defined time period, the UE 100 may reattempt to re-register with the PLMN A having the LAC $(1234)_H$. Other parameters associated with the PLMN A, such as the first defined time period and the services stopped by the PLMN A e.g., the PS and/or CS services, may also be included in the list.

Prior to expiration of the first defined time period, the UE 100 continues with the PLMN search to detect a PLMN which may provide both PS and CS services. As depicted in FIG. 3b, when a PLMN B having the LAC $(5678)_H$ and offering both PS and CS services is detected, the UE 100 may send a registration request to the PLMN B having the LAC $(5678)_H$. In this example, an abnormal scenario has occurred at the UE 100 and/or the PLMN B. As such, the PLMN B may reject the registration request of the UE 100. In such circumstances, conventional UEs would delete information associated with the PLMN B, in compliance with the 3GPP specification. However, according to some example embodiments, the UE 100 may, after detecting the rejection of the registration request by the PLMN B, update the list by adding the identity and LAC of the PLMN B in the list. The UE 100 may similarly set a second defined time period, during which the UE 100 may exclude PLMN B having the LAC $(5678)_H$ while performing a PLMN search to detect another PLMN. After the second defined time period expires, the UE 100 may reattempt to register with the PLMN B having the LAC $(5678)_H$.

As depicted in FIG. 3c, prior to the expiration of the first defined time period, the UE 100 may again attempt to register with the PLMN A, but having the LAC $(ABCD)_H$. The UE 100 may successfully register with PLMN A because the LAC is different. Although the PLMN identity is same (e.g., PLMN A), the UE 100 may register successfully if the LAC is different and information regarding PLMN A is not deleted from the UE 100. The UE 100 may also reattempt to register with either the PLMN A with LAC $(1234)_H$, or the PLMN B with LAC $(5678)_H$, after expiry of the first defined period, or the second defined period, respectively, because the information regarding the PLMN A and the PLMN B is stored in the UE 100.

Conventional UEs are unable to successfully register with PLMNs and/or the RPLMN following the occurrence of the abnormal scenario because the conventional UEs delete the information associated with PLMNs and/or the RPLMN in response to the abnormal scenario. When conventional UEs successfully register with a new PLMN, registration information about the old PLMN (where the abnormal scenario might have occurred) is replaced with registration information about the new PLMN. The registration information can include at least one of Location Area Identifier (LAI), Routing Area Identifier (RAI), Tracking Area Identifier (TAI), security keys exchanged during the registration procedure, and so no. This results in a situation in which the conventional UEs repeatedly attempt to register with the same PLMNs and/or the RPLMN with which successful registration is impossible. For example, a conventional UE may attempt to register with the PLMN B following a failed registration with PLMN A, and attempt to register with the PLMN A following a failed registration with PLMN B, repeatedly. The negative consequences of such a situation include lack of access for the UE to PS and/or CS services, inability of the UE to register with a higher priority PLMN, and excessive power consumption by the UE. However, according to some example embodiments, the UE 100 improves over the conventional UEs by storing a list including parameters of PLMNs with which the UE 100 has experienced a failed registration. By storing the information of such PLMNs, the UE 100 may successfully register with these same PLMNs at a later time, thereby avoiding the lack of access to PS and/or CS services, inability to register with a higher priority PLMN, and excessive power consumption experienced by conventional UEs.

Figure 4A:
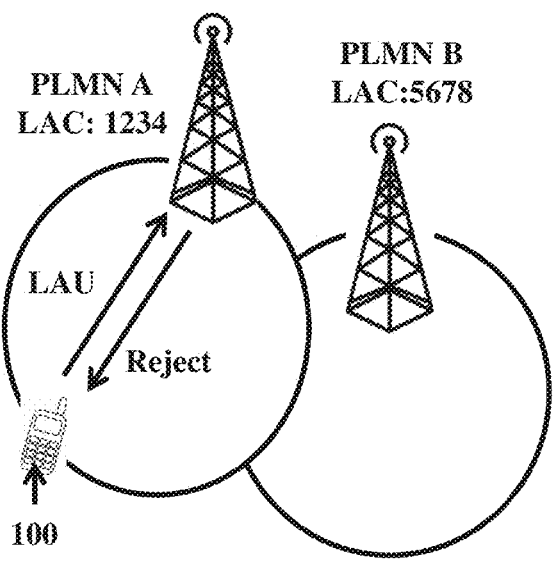
FIGS. 4a-4c depict an example scenario, wherein a UE registers with a first PLMN after a second PLMN stops providing one of CS or PS services to the UE, while the UE receives the other of the PS or CS services from the second PLMN, according to some example embodiments as disclosed herein.
Figure 4B:
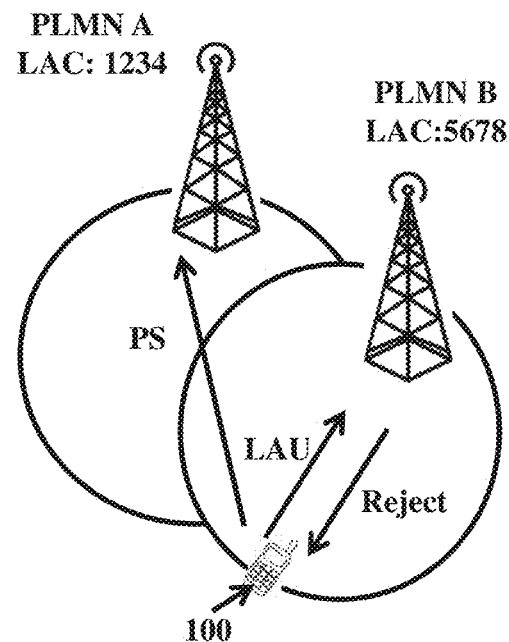
Figure 4C:
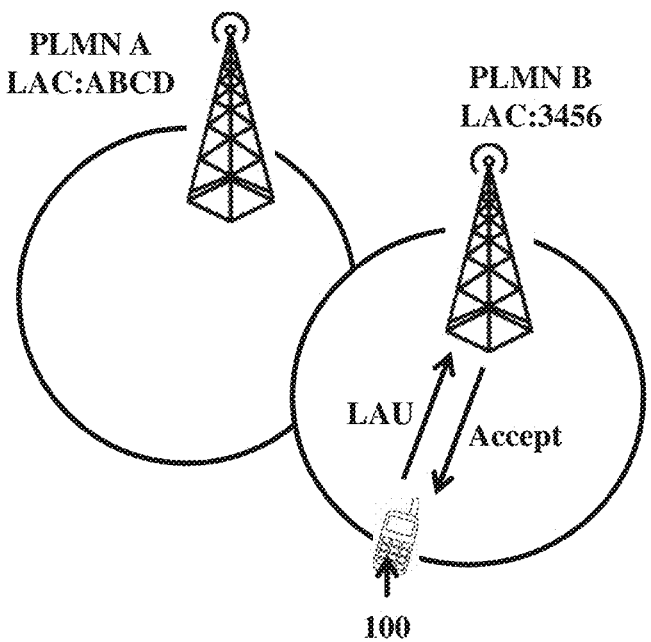

FIGS. 4a-4c depict an example scenario, wherein the UE 100 registers with a PLMN (e.g., PLMN B), which provides CS and PS services while receiving either PS or CS service from another PLMN (e.g., PLMN A). In this scenario, network selection in the UE 100 is set to automatic mode. Initially the UE 100, in a particular location, may attempt to register with PLMN A having the LAC $(1234)_H$. The PLMN A having the LAC $(1234)_H$ may accept the registration request and provide PS and CS services to the UE 100. As depicted in FIG. 4a, at a particular instant the PLMN A may stop offering CS service due to occurrence of an abnormal scenario. In such circumstances, the UE 100 may add a LAC and the identity of the PLMN A, a first defined time period for which the UE 100 may exclude the PLMN A having the LAC $(1234)_H$ while performing a PLMN search, and one or more types of service not offered by the PLMN A, e.g., CS, to the list stored at the UE 100. After the first defined time period expires, the UE 100 may reattempt to register with the PLMN A having the LAC $(1234)_H$ to receive the CS service.

As depicted in FIG. 4b, the UE 100 may continue with PLMN search, within the first defined time period, to detect another PLMN, which may provide both the PS and CS services. The PLMN search may proceed while the UE 100 continues to receive the PS service from PLMN A with the LAC $(1234)_H$. The UE 100 may send a registration request to the PLMN B having the LAC $(5678)_H$. Due to occurrence of an abnormal scenario at the UE 100 and/or the PLMN B, the PLMN B having the LAC $(5678)_H$ may reject the registration request of the UE 100. The UE 100 may, thereafter, update the list by adding the identity and LAC of the PLMN B to the list. The UE 100 may set a second defined time period, for which the UE 100 may exclude the PLMN B having the LAC $(5678)_H$, while performing a PLMN search. After the second defined time period expires, the UE 100 may reattempt to register with the PLMN B having the LAC $(5678)_H$.

As depicted in FIG. 4c, prior to the expiration of the second defined time period, the UE 100 may again attempt to register with the PLMN B, but having the LAC $(3456)_H$. The UE 100 may successfully register with PLMN B because the LAC is different. Although the identity of the PLMN is same (e.g., PLMN B), the UE 100 may register successfully if the LAC is different and information regarding PLMN B is not deleted from the UE 100. The UE 100 may also reattempt to register with either the PLMN A with LAC $(1234)_H$, or the PLMN B with LAC $(5678)_H$, after expiry of the first defined period, or the second defined period, respectively, because the information regarding the PLMN A and the PLMN B are stored in the list in the UE 100.

According to some example embodiments, since the registration request of the UE 100 with the PLMN B having the LAC $(3456)_H$ is successful, the UE 100 may not attempt to register with the PLMN A having the LAC $(ABCD)_H$, or the PLMN A having the LAC $(1234)_H$, even if the priority of the PLMN B is lower than that of the PLMN A. Thus, switching back and forth by the UE 100 between the PLMN A and PLMN B is reduced or prevented, enabling considerable battery saving at the UE 100. Upon successful registration with the PLMN B having the LAC $(3456)_H$, the UE 100 discontinues reception of the PS service from PLMN A with LAC $(1234)_H$.

Figure 5A:
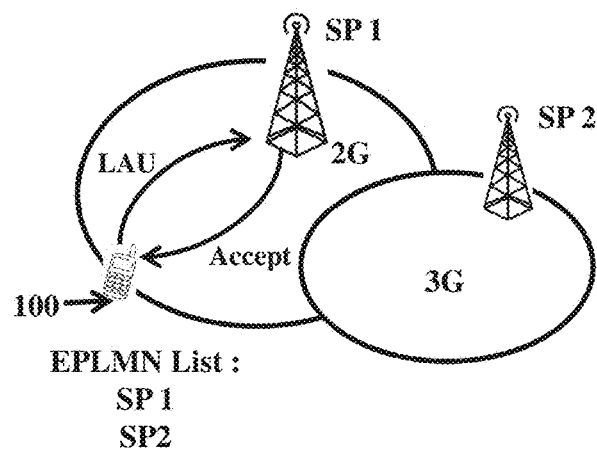
FIGS. 5a-5d depict an example scenario, wherein the UE maintains access to several types of services by retaining RPLMN information and/or PLMN information within an EPLMN list, according to some example embodiments as disclosed herein.
Figure 5B:
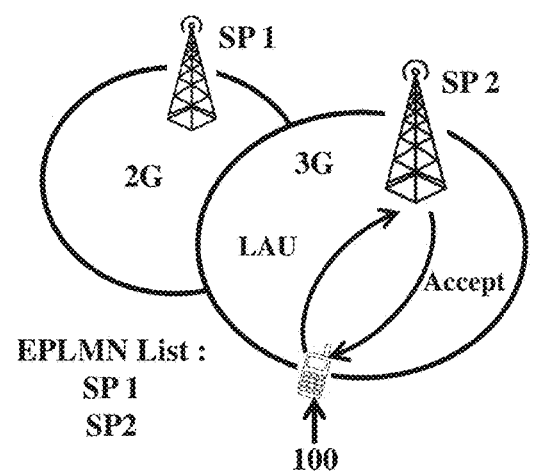

FIGS. 5a-5d depict an example scenario, wherein the UE 100 may have access to several types of services by retaining RPLMN information and PLMN information within an EPLMN list stored at the UE 100. In this scenario, network selection in the UE 100 is set to manual. The UE 100 may receive services from a particular Service Provider (SP). The UE 100 may be located in an area, wherein the UE 100 may receive services from either SP1 or SP2. The SP1 and SP2 may be included in the EPLMN list. In an example, consider that the UE 100 receives services of a SP3. The SP3 can have agreements with SP1 and SP2 to provide service to the subscribers of SP3. The UE 100 is not in converage area of SP3, and is in the converage of SP1 and SP2. As the SP3 has agreements with SP1 and SP2, the UE 100 can receive services in different RATs from at least one of SP1 and SP2. Therefore, SP1 and SP2 are included in the EPLMN list. As depicted in FIG. 5a, initially the UE 100 may receive 2G services from the SP1 as the UE 100 has registered with SP1 to receive 2G services. The RPLMN at this stage may be SP1. In compliance with the 3GPP specification guidelines, the UE 100 may perform a PLMN search and, as depicted in FIG. 5b, connect (e.g., register) with the SP2 to receive 3G services. The RPLMN at this stage may be SP2 as the UE 100 has registered with SP2 to receive 3G services.

In an example (not shown), if SP1 stops providing 2G services due to occurrence of an abnormal scenario, the UE 100 can preserve the information of SP1 (RPLMN) in the EPLMN list. This is unlike conventional UEs which delete information of SP1 if SP1 stops providing the 2G services. The information regarding the SP1 may be included for a defined period in the list stored at the UE 100.

Figure 5C:
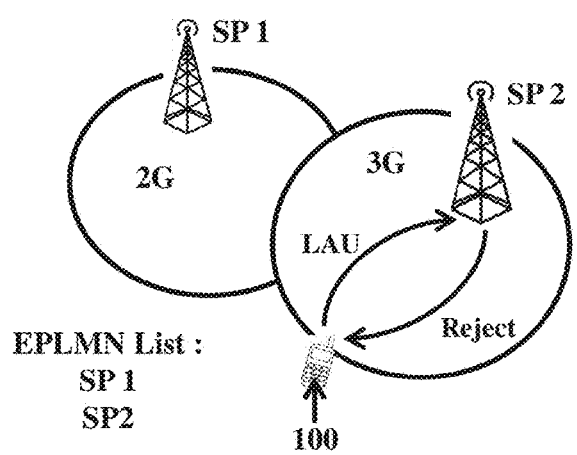

As depicted in FIG. 5c, the SP2 may reject offering (e.g., stop offering or providing) 3G services to the UE 100 due to occurrence of an abnormal scenario. Conventional UEs delete the RPLMN (i.e. SP2) when the 3G services are denied (e.g., rejected or stopped) by SP2 according to the 3GPP specification guidelines. Due to deletion of the RPLMN (i.e. SP2), all PLMNs in the EPLMN list are deleted; e.g., with deletion of the SP2, the SP1 is also deleted. The UE 201 is unable, therefore, to connect with either SP1 or SP2. The UE 201 is only able to receive limited services.

Figure 5D:
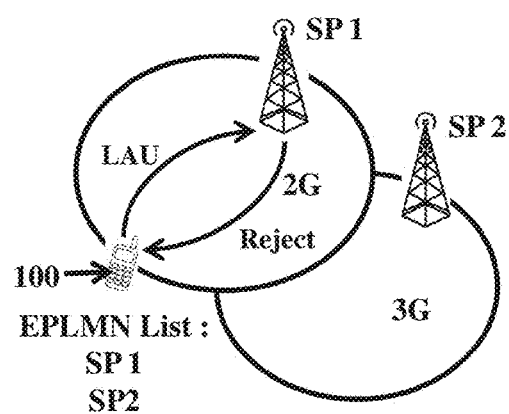

However, according to some example embodiments, when the 3G services are denied (e.g., rejected or stopped) by the SP2, the UE 100 may refrain from deleting the information of SP2 (e.g., parameters such as those discussed above in association with FIGS. 3a-4c) from the EPLMN list. The information regarding the SP2 may be included for a defined period in the list stored at the UE 100. During the defined period, the UE 100 refrains from registering with SP2 for receiving 3G services. As the information of SP1 and SP2 in the EPLMN list is preserved, the UE 100 may attempt to register with a PLMN (e.g. SP1) included in the EPLMN list to receive the PS and/or CS services on the same RAT (e.g. 2G), or different RATs (e.g. 3G). As depicted in FIG. 5d, the UE 100, may register with the SP1 again and receive the 2G services. Also, the UE 100 may reattempt to register with PLMN B to receive 3G services, once the defined time period has expired. Therefore, according to some example embodiments, the UE 100 improves over the conventional UEs by storing a list including RPLMN and/or PLMN (e.g. SP1 and SP2 in FIG. 5d) information following a failed registration. By storing the RPLMN and/or PLMN information, the UE 100 may successfully register with the same RPLMN and/or PLMNs at a later time, thereby enabling access to the several types of services (as opposed to the limited services accessible by the conventional UEs).

The example embodiments disclosed herein may be implemented through at least one software program running on at least one hardware device and performing network management functions to control the components. The components shown in FIG. 1 include blocks, which may be at least one of a hardware device, or a combination of hardware device and software module.

The example embodiments disclosed herein describe methods and UEs for recovering from abnormal scenarios cause release of a connection between a network and a UE. Therefore, it is understood that the scope of the protection is extended to a computer readable medium containing a program code for implementation of one or more operations of the methods, when the program code is executed on a server, UE, or any suitable programmable device. The method is implemented, in some example embodiments, through or together with a software program written in, e.g., Very high speed integrated circuit Hardware Description Language (VHDL), another programming language, or implemented by one or more VHDLs, or several software modules being executed on at least one hardware device. The at least one hardware device may be any kind of portable, programmable device. The at least one hardware device may also include hardware, e.g., an ASIC, or a combination of hardware and software, e.g., an ASIC and an FPGA, or at least one microprocessor executing one or more software modules stored in at least one memory. The example embodiments described herein could be implemented partly in hardware and partly in software. Alternatively, the example embodiments may be implemented on different hardware devices, e.g., using a plurality of CPUs.

The foregoing description of some example embodiments will so fully reveal the general nature of the example embodiments herein that others can, by applying current knowledge, readily modify and/or adapt for various applications some example embodiments without departing from the generic concepts, and, therefore, such adaptations and modifications should and are intended to be comprehended within the meaning and range of equivalents of the example embodiments. It is to be understood that the phraseology or terminology employed herein is for the purpose of description and not of limitation. Therefore, while some example embodiments herein have been described, those skilled in the art will recognize that the example embodiments herein can be practiced with modification within the spirit and scope of the example embodiments as described herein.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

We claim:

1. A method performed by a User Equipment (UE) for managing services availed from a Public Land Mobile Network (PLMN), the method comprising:
    detecting an interruption of a Radio Resource (RR) connection with a first PLMN associated with at least one first parameter, the interruption resulting in a loss of access to at least one type of service from the first PLMN;
    adding the at least one first parameter, the at least one type of service, and a first defined time period to a list which is stored in a memory;
    maintaining the list in the memory during the first defined time period; and
    performing a PLMN search excluding the first PLMN associated with the at least one first parameter in the list during the first defined time period,
    wherein the performing the PLMN search comprises detecting a second PLMN associated with at least one second parameter within the first defined time period, the second PLMN providing access to the at least one type of service, the at least one second parameter being different from the at least one first parameter.

2. The method, as claimed in claim 1, wherein the at least one first parameter includes at least one of an identity of the first PLMN, a Location Area Code (LAC) and a Tracking Area Code (TAC).

3. The method, as claimed in claim 1, wherein the at least one type of service is at least one of a Circuit Switching (CS) service or a Packet Switching (PS) service.

4. The method, as claimed in claim 1, wherein,
    the at least one type of service is a PS service, and
    the method further includes receiving a CS service from the first PLMN while performing the PLMN search.

5. The method, as claimed in claim 1, wherein,
    the at least one type of service is a CS service, and
    the method further includes receiving a PS service from the first PLMN while performing the PLMN search.

6. The method, as claimed in claim 1, wherein the method further comprises:
    removing the at least one first parameter, the at least one type of service, and the first defined time period from the list in response to determining that the first defined time period has expired.

7. The method, as claimed in claim 1, further comprising:
    registering with the second PLMN, the second PLMN having a lower priority than the first PLMN.

8. The method, as claimed in claim 1, further comprising:
    detecting an interruption of a RR connection with the second PLMN, the interruption resulting in a loss of access to at least one type of service from the second PLMN;
    adding the at least one second parameter, the at least one type of service from the second PLMN and a second defined time period to the list, the second defined time period being different from the first defined time period; and
    maintaining the list in the memory during the second defined time period.

9. The method, as claimed in claim 8, wherein the detecting an interruption of the RR connection with the second PLMN comprises detecting a rejection of a registration request with the second PLMN.

10. The method, as claimed in claim 9, further comprising:
    performing a PLMN search excluding the second PLMN associated with the at least one second parameter in the list during the second defined time period.

11. A User Equipment (UE) for managing services availed from a Public Land Mobile Network (PLMN), the UE comprising:
  a receiver configured to detect an interruption of a Radio Resource (RR) connection with a first PLMN associated with at least one first parameter, the interruption resulting in a loss of access to at least one type of service from the first PLMN;
  a memory configured to store a list; and
  at least one processor configured to:
    add the at least one first parameter, the at least one type of service, and a first defined time period to the list; and
    maintain the list in the memory during the first defined time period, wherein the receiver is further configured to:
      preform a PLMN search excluding the first PLMN associated with the at least one first parameter in the list during the first defined time period; and
      detect a second PLMN associated with at least one second parameter during the PLMN search, the second PLMN providing access to the at least one type of service, the at least one second parameter being different from the at least one first parameter.

12. The UE, as claimed in claim 11, wherein the at least one first parameter includes at least one of an identity of the first PLMN, a Location Area Code (LAC) and a Tracking Area Code (TAC).

13. The UE, as claimed in claim 11, wherein the at least one type of service is at least one of a Circuit Switching (CS) service or a Packet Switching (PS) service.

14. The UE, as claimed in claim 11, wherein,
  the at least one type of service is a PS service, and
  the receiver is further configured to receive a CS service from the first PLMN during the PLMN search.

15. The UE, as claimed in claim 11, wherein,
  the at least one type of service is a CS service, and
  the receiver is further configured to receive a PS service from the first PLMN during the PLMN search.

16. The UE, as claimed in claim 11, wherein the at least one processor is further configured to
  remove the at least one first parameter, the at least one type of service, and the first defined time period from the list in response to determining that theirs defined time period has expired.

17. The UE, as claimed in claim 11, wherein the at least one processor is further configured to:
  register with the second PLMN, the second PLMN having a lower priority than the first PLMN.

18. The UE, as claimed in claim 11, wherein the receiver is further configured to detect an interruption of a RR connection with the second PLMN, the interruption resulting in a loss of access to at least one type of service from the second PLMN, and
  the at least one processor is configured to:
    add the at least one second parameter, the at least one type of service from the second PLMN and a second defined time period to the list, the second defined time period being different from the first defined time period; and
    maintain the list in the memory during the second defined time period.

19. The UE, as claimed in claim 18, wherein the receiver is further configured to detect the interruption of the RR connection with the second PLMN by detecting a rejection of a registration request with the second PLMN.

20. The UE, as claimed in claim 19, wherein the receiver is further configured to perform a PLMN search excluding the second PLMN associated with the at least one second parameter in the list during the second defined time period.

* * * * *